(12) United States Patent
Martin et al.

(10) Patent No.: US 6,963,049 B1
(45) Date of Patent: Nov. 8, 2005

(54) SNOW REMOVAL SYSTEM

(76) Inventors: Jamarell M. Martin, 2810 Willow Ave. #103, Clovis, CA (US) 93612; Ella M. Martin, 2810 Willow Ave. #103, Clovis, CA (US) 93612

( * ) Notice: Subject to any disclaimer, the term of this patent is extended or adjusted under 35 U.S.C. 154(b) by 0 days.

(21) Appl. No.: 10/966,166

(22) Filed: Oct. 15, 2004

(51) Int. Cl.$^7$ ................................................ B60L 1/02
(52) U.S. Cl. ...................... 219/202; 219/219; 219/203
(58) Field of Search ................. 219/202, 201, 219/203, 213, 528; 392/379, 383; 15/313; 454/123

(56) References Cited

U.S. PATENT DOCUMENTS

| | | | | |
|---|---|---|---|---|
| 2,389,704 A | * | 11/1945 | Villani | 454/122 |
| 3,594,547 A |   | 7/1971 | Quinn | |
| 4,021,008 A |   | 5/1977 | Eichenauer | |
| 4,131,834 A |   | 12/1978 | Blaszkowski | |
| 4,366,368 A | * | 12/1982 | Stephens, III | 392/385 |
| 4,874,921 A | * | 10/1989 | Gerbig, Jr. | 219/202 |
| 4,904,844 A | * | 2/1990 | Chamberlin | 219/203 |
| 5,025,130 A | * | 6/1991 | Slone | 219/203 |
| D325,250 S |   | 4/1992 | Kloster | |
| 5,140,719 A | * | 8/1992 | Cowan | 15/313 |
| 5,351,918 A | * | 10/1994 | Giamati et al. | 244/134 D |
| 5,486,139 A | * | 1/1996 | Papp | 454/123 |
| 5,617,608 A | * | 4/1997 | Primlani | 15/313 |
| 5,765,779 A | * | 6/1998 | Hancock et al. | 244/134 D |
| 5,791,407 A | * | 8/1998 | Hammons | 165/202 |
| 5,804,799 A | * | 9/1998 | Stewart | 219/528 |
| 5,844,202 A | * | 12/1998 | Alverson | 219/203 |
| 5,897,802 A | * | 4/1999 | Jones | 219/202 |
| 5,987,216 A | * | 11/1999 | Krug | 392/379 |
| 6,011,244 A |   | 1/2000 | Castle et al. | |
| 6,049,655 A | * | 4/2000 | Vazirani | 392/366 |
| 6,696,674 B1 | * | 2/2004 | Doornsbosch | 219/528 |
| 2004/0134995 A1 | * | 7/2004 | Keeler | 237/12 |

* cited by examiner

*Primary Examiner*—Robin O. Evans
*Assistant Examiner*—Vinod Patel

(57) ABSTRACT

A snow removal system for melting snow from the body of a vehicle is disclosed. The snow removal system includes a control assembly being designed for operationally coupling to a power supply of the vehicle. A plurality of conducting strips are operationally coupled to the control assembly. The conducting strips are designed for being coupled to the body of the vehicle. The control assembly distributes power through the conducting strips whereby the conducting strips generate heat when power is passed through the conducting strips for warming the body of the vehicle to melt snow on the vehicle.

1 Claim, 3 Drawing Sheets

SNOW REMOVAL SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

The present invention relates to windshield surface blowers and more particularly pertains to a new snow removal system for melting snow from the body of a vehicle.

2. Prior Art

The use of windshield surface blowers is known in the prior art. U.S. Pat. No. 5,486,139 describes a device for blowing snow off the exterior surface of a windshield. U.S. Pat. No. 4,021,008 has electrical resistance heaters imbedded in the shell of an aircraft for melting snow and ice forming on the aircraft. U.S. Pat. No. 6,001,244 has a window having a plurality of closely spaced wires that are heated when an electric current is passed through the wires and heats the window to remove ice and snow. U.S. Pat. No. 3,594,547 has a heater flexible heating pad for heating the engine, battery, seat or rear window of the vehicle. U.S. Pat. No. 4,131,834 has a plurality of sensors which are coupled to the windshield wiper system and are activated in response to the precipitation on the windshield. U.S. Pat. No. Des. 325,250 shows a vehicle windshield defroster.

BRIEF SUMMARY OF THE INVENTION

An object of the present invention is to provide a new snow removal system that melts snow from the body of the vehicle so that the user does not need to stand out in the elements to clear the vehicle.

Even still another object of the present invention is to provide a new snow removal system that has a sensor assembly for sensing snow on the vehicle to initiate removal of the snow from the vehicle without intervention from the user.

To this end, the present invention generally comprises a control assembly being designed for operationally coupling to a power supply of the vehicle. A plurality of conducting strips are operationally coupled to the control assembly. The control assembly distributes power through the conducting strips whereby the conducting strips generate heat when power is passed through the conducting strips for warming the body of the vehicle to melt snow on the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE SEVERAL VIEWS OF THE DRAWING

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
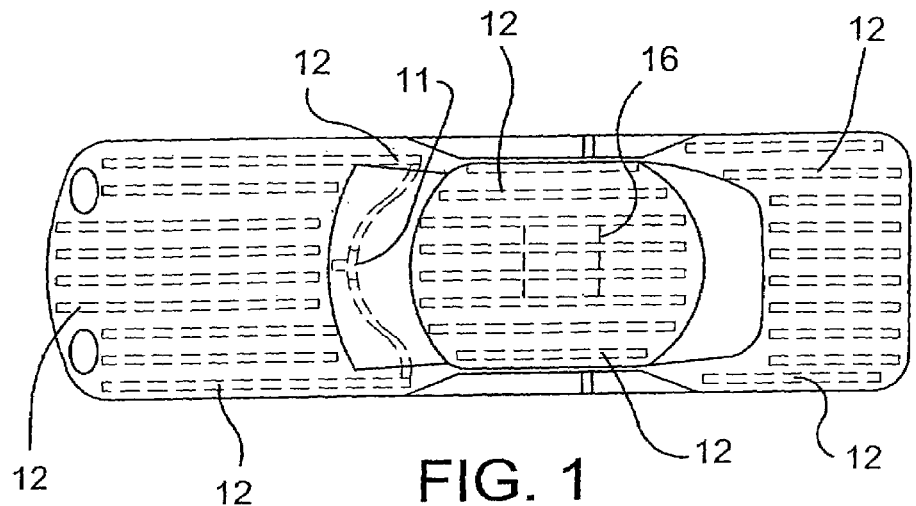
FIG. 1 is a top plan view of a new snow removal system, in accordance with the present invention.
Figure 4:
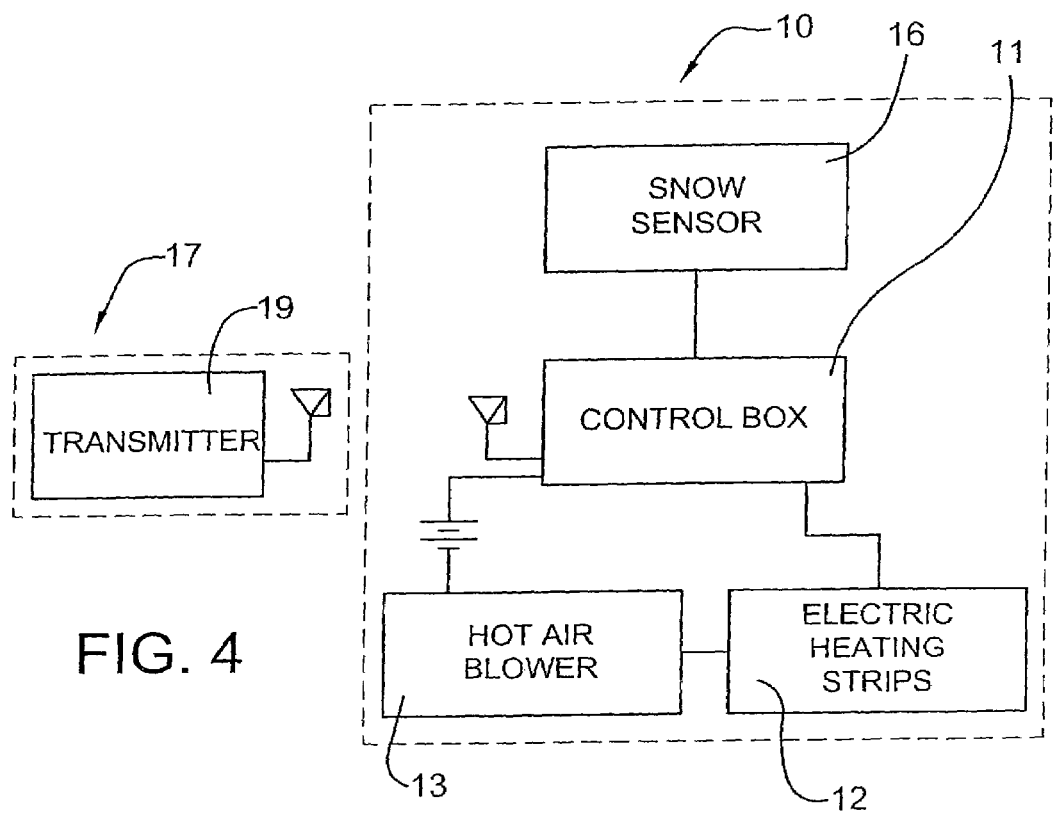
FIG. 4 is a schematic block diagram showing the interrelationship between the major components of the present invention.
Figure 2:
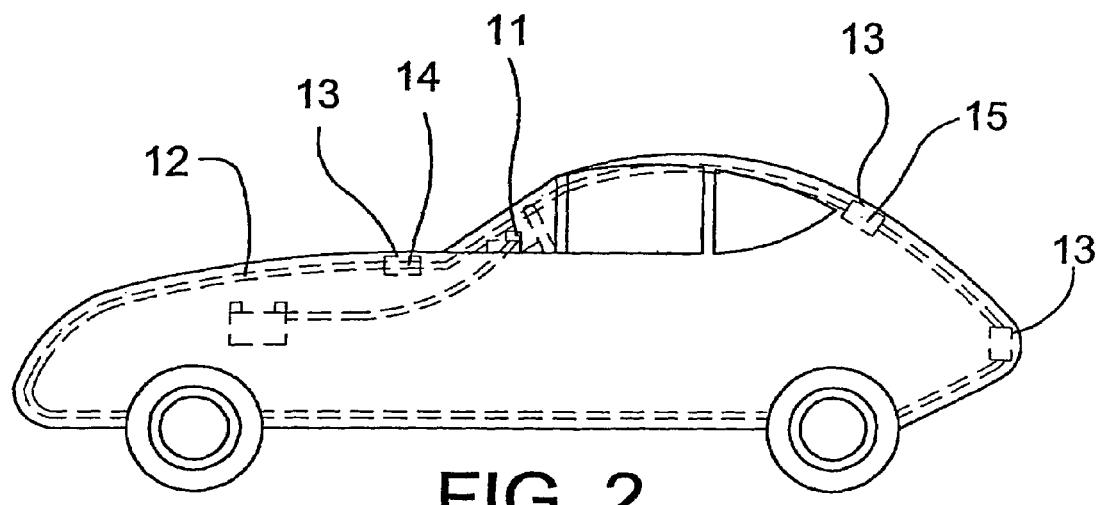
FIG. 2 is a side elevational view of the system shown in FIG. 1.
Figure 3:
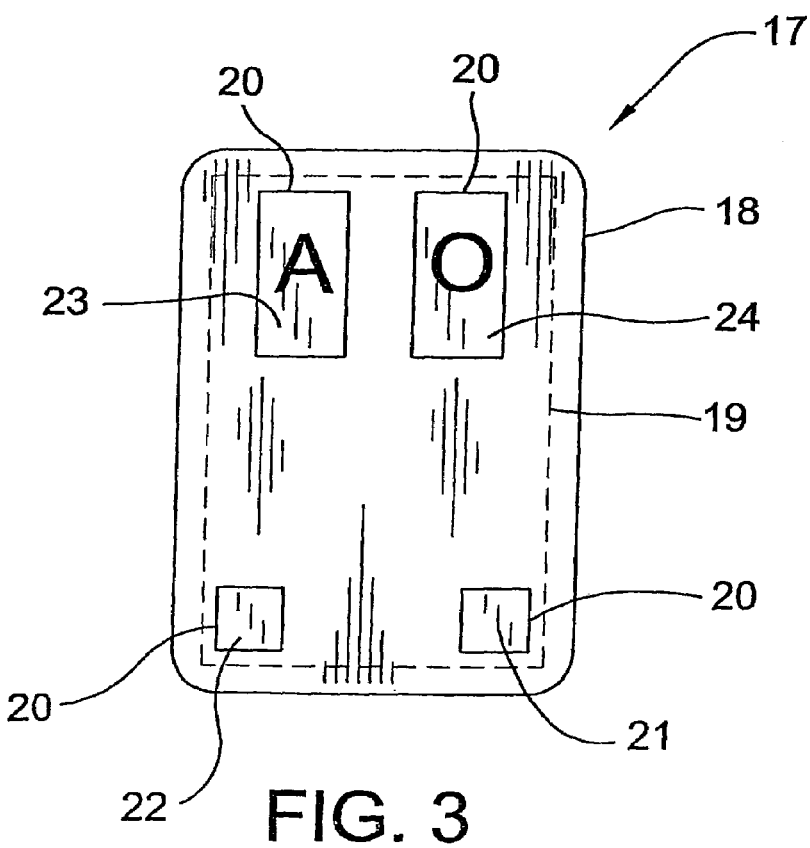
FIG. 3 is a top plan view of the remote assembly employed by the present invention.
Figure 5:
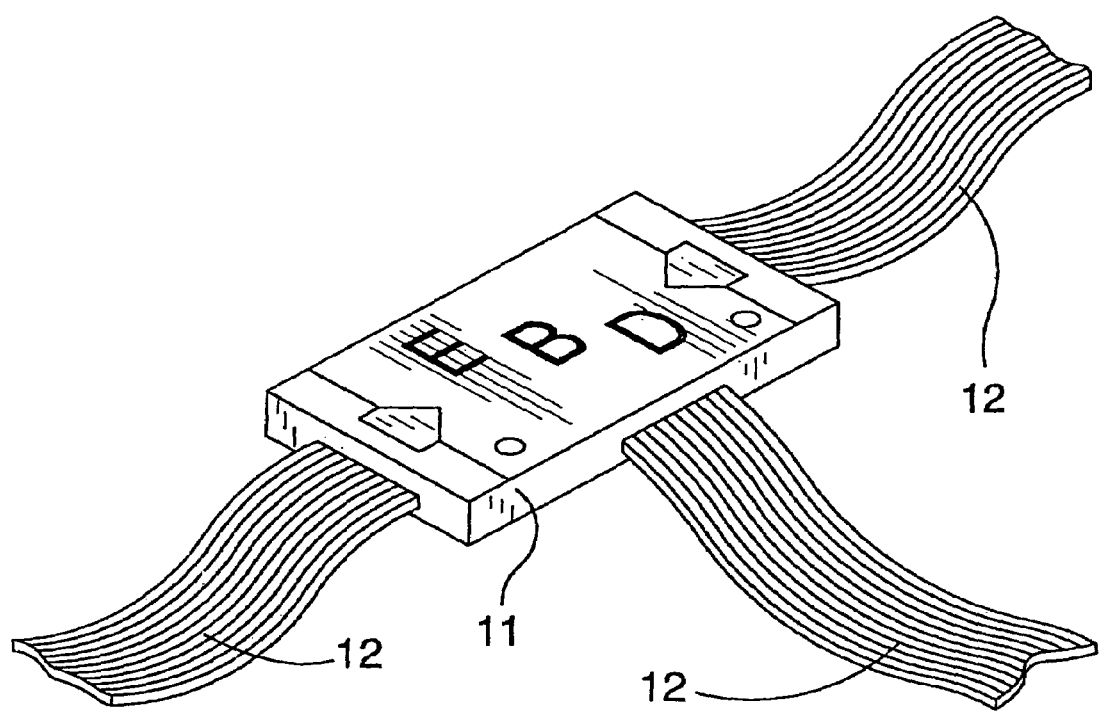
FIG. 5 is a perspective view showing the control assembly of the present invention.

With reference now to the drawings, and in particular to FIGS. 1 through 5 thereof, a new snow removal system embodying the principles and concepts of the present invention and generally designated by the reference number 10 will be described.

As best illustrated in FIGS. 1 through 5, the snow removal system 10 generally comprises a control assembly 11 being designed for operationally coupling to a power supply of the vehicle.

A plurality of conducting strips 12 are operationally coupled to the control assembly 11. The conducting strips 12 are designed for being coupled to the body of the vehicle. The control assembly 11 distributes power through the conducting strips 12 whereby the conducting strips 12 generate heat when power is passed through the conducting strips 12 for warming the body of the vehicle to melt snow on the vehicle.

A plurality of heater assemblies 13 are operationally coupled to the conducting strips 12. Each of the heater assemblies 13 is designed for being coupled to an interior surface of the body of the vehicle. Each of the heater assemblies 13 is designed for warming air and forcing air through cavities in the vehicle when the heater assemblies 13 are supplied power from the conducting strips 12.

The plurality of the heater assemblies 13 comprises a front heater assembly 14. The front heater assembly 14 is positioned proximate a front window of the vehicle. The front heater assembly 14 is designed for blowing heated air across the exterior of the front window of the vehicle for melting snow on the front window.

The plurality of the heater assemblies 13 comprises a rear heater assembly 15. The rear heater assembly 15 is positioned proximate a rear window of the vehicle. The rear heater assembly 15 is designed for blowing heated air across the exterior of the rear window of the vehicle for melting snow on the rear window.

A sensor assembly 16 is operationally coupled to the control assembly 11. The sensor assembly 16 is designed for coupling to the body of the vehicle. The sensor assembly 16 is designed for detecting snow on the body of the vehicle whereby the sensor assembly 16 actuates the control assembly 11 for providing power to the conducting strips 12 when the sensor assembly 16 detects snow on the body of the vehicle.

Now referring to FIG. 1, a remote assembly 17 has a body member 18. The body member 18 is designed for being held by the user. The remote assembly 17 has a transmitter 19. The remote assembly 17 has a plurality of buttons 20 being operationally coupled to the transmitter 19. Each of the buttons 20 actuates the transmitter 19 for transmitting a control signal to the control assembly 11 whereby each of the buttons 20 is for controlling operation of the control assembly 11 when the buttons 20 are actuated by the user.

The plurality of the buttons 20 of the remote assembly 17 comprises an off button 21 and an on button 22. The off button 21 is for actuating the control assembly 11 for disconnecting the conducting strips 12 from the power supply of the vehicle when the off button 21 is actuated by the user. The on button 22 is for actuating the control assembly 11 connecting the power supply to the conducting strips 12 and the sensor assembly 16 when the on button 22 is actuated by the user.

The plurality of buttons 20 of the remote assembly 17 comprises an automatic button 23. The automatic button 23 is for selectively engaging the sensor assembly 16 to the control assembly 11 whereby the sensor assembly 16 actuates the control assembly 11 to provide power to the conducting strips 12 when the sensor assembly 16 senses snow on the body of the vehicle and the sensor assembly 16 is engaged with the control assembly 11. The plurality of buttons 20 comprises a manual button 24. The manual button 24 selectively disengages the sensor assembly 16 from the control assembly 11 designed for permitting manual control of the control assembly 11 for providing power from the power source to the conducting strips 12 when the manual button 24 is actuated by the user.

In use, the user may actuate the automatic button 23 and allow the sensor assembly 16 to sense the snow on the car and actuate the control assembly 11 to allow power to flow through the conducting strips 12 to warm the body of the vehicle to melt the snow on the vehicle. The heating assemblies also heat air and blow the heated air over the front and rear windows of the vehicle to clear snow from the windows. The user may actuate the manual button 24 to disengage the sensor assembly 16 from the control assembly 11 to allow the user to control the supplying of power to the conducting strips 12 and the heating assemblies through the use of the on and off buttons 21, 20 on the remote assembly 17.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A snow removal system for removing snow from a vehicle, the snow removal system comprises:

a control assembly operationally connected to a power supply of the vehicle;

a plurality of conducting strips operationally connected to said control assembly, said conducting strips connected to the body of the vehicle, said control assembly distributing power through said conducting strips such that said conducting strips generate heat when power is passed through said conducting strips for warming the body of the vehicle to melt snow on the vehicle;

a plurality of hot air blowers operationally connected to said conducting strips for power supply, each of said hot air blowers connected to an exterior surface of the body of the vehicle to heat the exterior of vehicle, said plurality of hot air blowers comprising a front heater assembly, said hot blowers positioned proximate a front window of the vehicle, said hot air blower blowing heated air across the exterior of the front window of the vehicle for melting snow on the front window;

said plurality of hot air blowers comprising a rear heater assembly, said hot air blowers positioned proximate a rear window of the vehicle, said rear hot air blower blowing heated air across the exterior of the rear window of the vehicle for melting snow on the rear window;

a sensor assembly operationally connected to said control assembly, said sensor assembly connected to the body of the vehicle, said sensor assembly detecting snow on the body of the vehicle such that said sensor assembly actuates said control assembly for providing power to said conducting strips when said sensor assembly detects snow on the body of the vehicle;

a remote assembly having a body member, said body member being held by the user, said remote assembly having a transmitter, said remote assembly having a plurality of buttons operationally connected to said transmitter, each of said buttons actuating said transmitter for transmitting a control signal to said control assembly to control operation, when said buttons are actuated by the user;

said plurality of said buttons of said remote assembly comprising an off button and an on button, said off button actuating said control assembly for disconnecting said conducting strips from the power supply of the vehicle when said off button is actuated by the user, said on button actuating said control assembly and connecting the power supply to said conducting strips and said sensor assembly when said on button is actuated by the user;

said plurality of buttons of said remote assembly comprising an automatic button, said automatic button selectively engaging said sensor assembly to said control assembly such that said sensor assembly actuates said control assembly to provide power to said conducting strips when said sensor assembly senses snow on the body of the vehicle and said sensor assembly is engaged with said control assembly; and said plurality of buttons comprising a manual button, said manual button selectively disengaging said sensor assembly, said manual button permitting manual control of said control assembly for providing power from the power source to said conducting strips when said manual button is actuated by the user.

* * * * *